United States Patent [19]

Downey et al.

[11] Patent Number: 5,762,891
[45] Date of Patent: Jun. 9, 1998

[54] PROCESS FOR STABILIZATION OF ARSENIC

[75] Inventors: Jerome P. Downey, Parker; Harry Mudgett, Lakewood, both of Colo.

[73] Assignee: Hazen Research, Inc., Golden, Colo.

[21] Appl. No.: 607,882

[22] Filed: Feb. 27, 1996

[51] Int. Cl.$^6$ ............... C01G 3/00; C01G 28/00
[52] U.S. Cl. ............................. 423/87; 423/87
[58] Field of Search ........................ 423/47, 87

[56] References Cited

U.S. PATENT DOCUMENTS

| | | | |
|---|---|---|---|
| 954,263 | 4/1910 | Dewey | 423/47 |
| 1,198,095 | 9/1916 | Anderson, Jr. | 423/47 |
| 2,596,580 | 5/1952 | McKay et al. | 75/9 |
| 3,172,755 | 3/1965 | Vian-Ortuno et al. | 75/9 |
| 4,025,430 | 5/1977 | Pagel | 210/53 |
| 4,241,039 | 12/1980 | Koh et al. | 423/531 |
| 4,244,734 | 1/1981 | Reynolds et al. | 75/101 R |
| 4,566,975 | 1/1986 | Allgulin | 210/711 |
| 4,622,149 | 11/1986 | Devuyst et al. | 210/717 |
| 4,724,084 | 2/1988 | Pahmeier et al. | 210/709 |
| 4,731,114 | 3/1988 | Ramadorai et al. | 75/118 R |
| 5,093,007 | 3/1992 | Domville | 210/713 |
| 5,123,956 | 6/1992 | Fernandez et al. | 75/423 |
| 5,137,640 | 8/1992 | Poncha | 210/724 |

FOREIGN PATENT DOCUMENTS

| | | | |
|---|---|---|---|
| WO 93/08310 | 4/1993 | Australia. | |
| 1536266 | 8/1968 | France | 423/47 |
| 59-164639 | 9/1984 | Japan | 423/87 |

OTHER PUBLICATIONS

G. Ramadorai and R.K. Mishra, "Roasting of Arsenical Gold And Silver Bearing Minerals", Metallurgical Department, Newmont Gold Company, Carlin, Nevada, Refinery Department, Pease and Curren Company, Warwick, Rhode Island, no date.

R.G. Robins and J.C.Y. Huang, "The Adsorption Of Arsenate Ion By Ferric Hydroxide", Department of Mineral Processing and Extractive Metallurgy, School of Mines, University of New South Wales, Kensington, N.S.W. 2033 Australia, no date.

E. Krause and V.A. Ettel, "Solubilities And Stabilities of Ferric Arsenates", J. Roy Gordon Research Laboratory, INCO Limited, Mississauga, Ontario, Canada, Oct. 1987.

R.G. Robins, "The Aqueous Chemistry Of Arsenic In Relation To Hydrometallurgical Procsses", The University of New South Wales, Kensington, N.S.W., Australia, Aug., 1985.

F.J. Arriagada and K. Osseo–Asare, "Gold Extraction From Refractory Ores: Roasting Behavior Of Pyrite And Arsenopyrite", Department of Materials Science and Engineering, The Pennsylvania State University, University Park, PA 16802, no date.

Mahesh C. Jha and Marcy J. Kramer, "Recovery Of Gold From Arsenical Ores", AMAX Extractive Research & Development, Inc., 5950 McIntyre Street, Golden, CO 80403, no date.

(List continued on next page.)

*Primary Examiner*—Steven Bos
*Attorney, Agent, or Firm*—Sheridan Ross P.C

[57] ABSTRACT

The present invention is a method to remove arsenic from arsenic-containing materials, such as an ore or concentrate, by roasting the arsenic-containing material to convert arsenic sulfides into arsenic oxides. The arsenic oxides are contained in the roasted arsenic-containing material. The roasted arsenic-containing material is contacted with a lixiviant to solubilize the arsenic in the oxide in a pregnant leach solution. Ferric arsenate, an environmentally stable compound, is formed in the lixiviant. The ferric arsenate can be removed to provide a treated solution complying with environmental regulations. The method provides a simple and effective technique for removing arsenic from arsenic-containing materials.

30 Claims, 2 Drawing Sheets

OTHER PUBLICATIONS

Piret, Norbert L. and Melin, "An Engineering Approach To The Arsenic Problem In The Extraction Of Non–Ferrous Metals", Stolbert Ingenieurberatung GmbH, Consulting Engineers, D–5190 Stolberg/Rhld, no date.

A.S. Block–Bolton et al., "Separation Of Arsenic From Nickel", Materials Processing Center, Massachusetts Institute of Technology, Cambridge, MA 02139, no date.

M. Stefanakis and A. Kontopoulas, "Production Of Environmentally Acceptable Arsenites–Arsenates From Solid Arsenic Trioxide", METBA S.A., 1 Eratosthenous Street, GR 166 35 Athens, Greece, no date.

Taylor, "Cyclone Roasting Of Refractory Sulfide, Precious Metal Concentrates", University of Idaho, no date.

PROCESS FOR STABILIZATION OF ARSENIC

FIELD OF THE INVENTION

The present invention generally relates to a process for stabilizing arsenic which occurs in arsenic-containing materials and more specifically to a process for converting arsenic in sulfide ores and concentrates into ferric arsenate.

BACKGROUND OF THE INVENTION

Many metals are derived from sulfide deposits, which deposits contain significant amounts of arsenic compounds (e.g., 60 ppm or more). The arsenic compounds occur mainly as sulfides, arsenides, or oxidation products thereof. By way of example, the arsenic compounds can be compounds of arsenic and sulfur alone (e.g., $As_2S_2$, $As_2S_3$ and $As_2S_5$) or can contain a variety of metals compounded with the arsenic and sulfur (e.g., FeAsS, $Cu_3AsS_4$, $Cu_{12}As_4S_{13}$, CoAsS and $Ag_3AsS_3$). Arsenic not only adversely impacts the recovery of non-ferrous basemetals and precious metals from sulfide ores and the conversion of sulfur-containing compounds into sulfuric acid but is also a highly toxic substance that is the subject of strict environmental regulations.

The primary process employed to separate the arsenic in sulfide ores from the metals contained in the ores or ore concentrates is roasting. The sulfide ore is roasted to volatilize the arsenic as arsenic trioxide (i.e., $As_2O_3$) in the roasting offgas and the calcine is then treated to recover the desired metals. This method has a number of problems. The roasting offgas can contain significant amounts not only of arsenic trioxide but also of sulfur dioxide. Both compounds are subject to strict emissions controls and can be difficult to remove from the offgas by scrubbing techniques. Even if the arsenic trioxide were to be efficiently removed in the scrubbing solution, the supply of arsenic trioxide currently exceeds demand. This disparity has resulted in the need to store large amounts of arsenic trioxide at a high cost. Arsenic trioxide can be environmentally unstable and, therefore, is subject to strict environmental controls.

There is a need for an improved process to remove arsenic from sulfide ores. There is a related need for a process to convert the arsenic sulfides into an environmentally stable form.

SUMMARY OF THE INVENTION

The present invention addresses these and other needs by providing a process that converts arsenic sulfide into ferric arsenate, which is an environmentally stable compound. As used herein, "arsenic sulfide" refers generally to any compound containing arsenic and sulfur, whether or not compounded with other elements and preferably refers to compounds having no oxygen, such as FeAsS, $Cu_3AsS_4$, $Cu_{12}As_4S_{13}$, CoAsS and $Ag_3AsS_3$. The arsenic in the arsenic sulfide is in the trivalent or pentavalent state. The process includes the steps: (i) roasting the arsenic-containing material in the presence of a controlled amount of oxygen to form a roasted arsenic-containing material containing arsenic oxide; (ii) contacting the roasted arsenic-containing material with a lixiviant to solubilize the arsenic oxide in the leach solution; and (iii) forming ferric arsenate in the pregnant leach solution containing dissolved arsenic. Arsenic oxide refers to any compound containing both arsenic and oxygen atoms. In the roasting step, a substantial portion of the arsenic sulfide is converted into arsenic oxide with the arsenic in the arsenic oxide being in the pentavalent state. In the instance where the arsenic-containing material contains iron, the roasting is also conducted in the presence of a controlled amount of sulfur dioxide to convert a substantial portion of the iron into a salt. The ferric arsenate can be removed from the pregnant leach solution to form a treated solution and a recovered product, each of which can be acceptable under existing environmental regulations.

A substantial portion of the arsenic sulfide in the arsenic-containing material is converted into arsenic oxide in the roasting step. Preferably, at least about 90% of the arsenic sulfide in the arsenic-containing material is converted into arsenic oxide during roasting.

A substantial portion of the arsenic oxide and sulfur in the arsenic-containing material is retained in the roasted arsenic-containing material and not volatilized into the roasting offgas. More preferably, at least about 95% of the arsenic in the arsenic-containing material is in the roasted arsenic-containing material. The offgas from the roasting step preferably includes about 10% or less of the arsenic from the arsenic-containing material. Preferably, no more than about 75% of the sulfur in the arsenic-containing material is contained in the roasted arsenic-containing material after roasting.

The roasting is conducted in an atmosphere containing controlled amounts of oxygen and sulfur dioxide to provide sufficient oxygen and sulfur potentials to fully oxidize arsenic oxides and any iron-containing materials and to convert the iron-containing materials into a form that is soluble in the lixiviant, preferably a salt. The potentials are realized by providing partial pressures of oxygen and sulfur dioxide in the roasting atmosphere each ranging from about 0.01 to about 0.1 atm.

The temperature of the arsenic-containing material during roasting is also controlled to inhibit arsenic and sulfur volatilization and sintering of the roasted arsenic-containing material. Preferably, the temperature of the arsenic-containing material and roasting atmosphere ranges from about 500° C. to about 650° C.

The roasted arsenic-containing material is contacted with the lixiviant to form the pregnant leach solution containing dissolved arsenic. To solubilize the arsenic oxides from the roasted arsenic-containing material, the lixiviant includes a leaching agent. The preferred leaching agents are sulfuric acid and/or, (hot) water with (hot) water being most preferred. Ferric sulfate can be added to the lixiviant or pregnant leach solution to facilitate subsequent formation of the ferric arsenate. Preferably, at least about 90% by weight of the arsenic from the roasted arsenic-containing material is dissolved in the leach solution.

In one embodiment, a leach residue is separated from the pregnant leach solution to recover any metals in the residue. To enhance metal recoveries, the leach residue is washed with a wash solution to remove arsenic from the residue. A portion of the wash solution can be combined with the pregnant leach solution prior to the formation of ferric arsenate.

In a preferred embodiment, the ferric arsenate is formed by first contacting the pregnant leach solution with an oxidant and second precipitating the arsenic as ferric arsenate. The preferred oxidant is hydrogen peroxide, oxygen, or mixtures thereof. Before precipitation, the pH of the pregnant leach solution preferably ranges from about pH 0 to about pH 1.0 and the temperature from about 20° C. to about 95° C. During precipitation, the pH preferably ranges from about pH 1.5 to about pH 2.5 and the temperature from about 20° C. to about 90° C.

The ferric arsenate can be removed from the pregnant leach solution to provide a treated solution having no more than about one milligram per liter of dissolved arsenic. Metals in the treated solution can be recovered from the treated solution by suitable techniques.

DETAILED DESCRIPTION

The method of the present invention solubilizes the arsenic in an arsenic-containing material using a lixiviant and precipitates the arsenic from a pregnant leach solution as ferric arsenate ($FeAsO_4$). Ferric arsenate is an environmentally stable form of arsenic oxide that is acceptable for disposal under most environmental regulations, as determined by the EPA Toxicity Characteristic Leaching Procedure. The process is of particular importance in the roasting of gold ores, the pretreatment of copper sulfide concentrates for hydrometallurgical processing, and thermal treatment of arsenic-containing waste materials.

The arsenic-containing material can contain a wide range of arsenic contents. The arsenic-containing material generally contains from about 0.01 to about 10% by weight arsenic. Typically, at least about 90% by weight of the arsenic is present in the form of a sulfide. The arsenic in the arsenic-containing material can be in the trivalent and/or pentavalent state. The arsenic-containing material will generally contain trivalent arsenic, particularly in the form $As_2S_3$.

The arsenic-containing material can also contain iron, typically in the form of a sulfide such as iron pyrite. The arsenic-containing material typically contains an amount of iron ranging from about 25 to about 45% by weight.

The arsenic-containing material can be an ore, concentrate or other metal-containing material that includes one or more metals to be recovered from the arsenic-containing material. Such metals include gold, copper, nickel, silver, cobalt, zinc, and mixtures thereof. The amount of the metal in the arsenic-containing material typically ranges from a few ounces per ton to about 40% by weight. The metal is typically in the form of a sulfide.

To cause the arsenic in the arsenic sulfide to be in a soluble form, the arsenic-containing material is first roasted under conditions sufficient to convert arsenic sulfides in the arsenic-containing material into arsenic oxides, preferably pentavalent, and to convert iron sulfides into ferric sulfate ($Fe_2(SO_4)_3$). The roasting reactions proceed according to the following equations:

$$2As_2S_{3(s)} + 11O_{2(g)} = 2As_2O_{5(s)} + 6SO_{2(g)}$$

$$2As_2S_{2(s)} + 9O_{2(g)} = 2As_2O_{5(s)} + 4SO_{2(g)}$$

$$2FeS_{2(s)} + 7O_{2(g)} = Fe_2(SO_4)_{3(s)} + SO_{2(g)}$$

$$4FeAsS_{(s)} + 15O_{2(g)} + 2SO_{2(g)} = 2As_2O_{5(s)} + 2Fe_2(SO_4)_{3(s)}$$

$$4Cu_3AsS_{4(s)} + 33O_{2(g)} = 2As_2O_{5(s)} + 12CuSO_{4(s)} + 4SO_{2(g)}$$

$$4CoAsS_{(s)} + 13O_{2(g)} = 2As_2O_{5(s)} + 4CoSO_{4(s)}$$

It is desired that the roasting conditions employed inhibit the volatilization of arsenic and any sulfur associated therewith and cause the arsenic and sulfur to be retained in a solid roasted arsenic-containing material. The arsenic and much of the sulfur are maintained in the solid phase to suppress the production of environmentally harmful compounds, specifically arsenic trioxide and sulfur dioxide, as byproducts and thereby avoid the attendant problems associated with their removal from the roasting offgas and subsequent disposal. As will be appreciated, the sulfur dioxide in the roasting atmosphere is maintained at a level sufficient for it to be consumed in the formation of ferric sulfate. Thus, relative to existing processes there is a significantly reduced amount of residual sulfur dioxide from the reaction to be scrubbed from the offgas.

As will be appreciated, the amount of arsenic and sulfur retained in the roasted arsenic-containing material depends upon the amount in the arsenic-containing material, the mineralogy, and the specific roasting conditions. Preferably, the roasted arsenic-containing material contains a majority of the arsenic and sulfur in the arsenic-containing material. More preferably, at least about 95% of the arsenic in the arsenic-containing material and at least about 50% of the sulfur in the arsenic-containing material is contained in the roasted arsenic-containing material.

The arsenic in the roasted arsenic-containing material is preferably in the form of an arsenic oxide and more preferably an arsenic oxide in the pentavalent state. At least about 90% of the arsenic in the arsenic-containing material is preferably converted into arsenic oxide in the roasting step. The arsenic oxide can include a variety of oxides, such as arsenic trioxide and arsenic pentoxide. Preferably, at least about 90% by weight of the arsenic oxides in the roasted arsenic-containing material are in the form of arsenic pentoxide (e.g., $As_2O_5$). It is preferred that at least about 90% of any trivalent arsenic in the arsenic-containing material be converted into pentavalent arsenic during roasting.

Due to the retention of the arsenic and sulfur in the roasted arsenic-containing material, the roasting offgas preferably includes at most a small proportion of the arsenic and sulfur in the arsenic-containing material. More preferably, the offgas includes at most about 10% and most preferably at most about 1.0% of the arsenic, and at most about 35% and most preferably at least about 25% of any sulfur in the arsenic-containing material. This yields an offgas containing preferably at most about 0.01% by volume arsenic and 5% by volume sulfur.

Valuable metals in the roasted metal-containing material are preferably in a recoverable form after roasting. By way of example, the above roasting conditions cause substantially all of the copper to be in a form, such as copper sulfate, ($CuSO_4$), which is amenable to recovery by conventional hydrometallurgical recovery techniques.

Iron in the arsenic-containing material, if present, is preferably sulfated during the roasting step to yield a salt, with ferric sulfate ($Fe_2(SO_4)_3$) being most preferred. Preferably, at least about 20% of the iron in the arsenic-containing material is converted into a salt. Sulfation promoters, such as sodium sulfate ($Na_2SO_4$), can be employed to increase the amount of ferric sulfate produced during roasting. The amount of sulfation promoters used preferably ranges from about 0% to about 3% by weight of the arsenic-containing material.

The above-noted results are produced by the appropriate roasting conditions. To yield proper oxidation conditions, the oxygen and sulfur potentials in the roasting step are carefully controlled. It is preferred that the roasting input gas contain more than the stoichiometric amount of oxygen required to oxidize the arsenic in the arsenic-containing material to the pentavalent state. If an insufficient amount of oxygen is present in the roasting input gas, the oxidized arsenic will primarily be in the trivalent state due to the limited availability of oxygen during roasting. To verify that the input gas contains sufficient oxygen for formation of arsenic pentoxide, it is preferred that the partial pressure of oxygen in the roasting offgas ranges from about 0.01 to about 0.1 atm and more preferably from about 0.04 to about 0.08 atm. The roasting input gas can be air or oxygen-enriched air, provided that the gas contains a sufficient amount of excess oxygen to maintain the oxygen partial pressure at the levels prescribed. Although the sulfur potential is also an important roasting condition for sulfation, the roasting input gas is preferably substantially free of sulfur dioxide. The degree of sulfation can be determined based upon the amount of sulfur dioxide in the offgas. The sulfur dioxide is a byproduct of the roasting reactions. The partial pressure of sulfur dioxide in the roasting offgas preferably ranges from about 0.01 to about 0.1 atm and more preferably from about 0.04 to about 0.06 atm. On a volumetric basis the amount of oxygen in the roasting offgas preferably ranges from about 4 to about 8% and the sulfur dioxide in the roasting offgas from about 4 to about 6% of the roasting atmosphere.

The arsenic-containing material during the roasting step is preferably maintained at a temperature of no more than about 650° C., more preferably from about 500° C. to about 600° C., and most preferably from about 520° C. to about 550° C. In addition to reducing the volatilization of arsenic, such temperatures are low enough to avoid sintering of the arsenic-containing material, especially silicates in the arsenic-containing material, while being high enough to optimize the oxidation and sulfation reactions, particularly the oxidation of the arsenic and sulfur in the arsenic-containing material and the sulfation of any iron in the material. Silicate sintering can decrease the porosity of the roasted arsenic-containing material, hindering the penetration of the lixiviant into the material and therefore the solubilization of arsenic and metals. High porosity and low sintering are thus desirable for the subsequent recovery of the metals from the roasted arsenic-containing material.

Because the oxidation reaction of the arsenic and/or sulfur-containing components of the arsenic-containing material is generally exothermic, the control of the roasting temperature can be difficult. One method to control the roasting temperatures is to add suitable amounts of a heat sink, such as silicates, water, and mixtures thereof.

Although the oxidation reaction of the arsenic- and/or sulfur-containing components of the arsenic-containing material is generally exothermic, it may be necessary to initially raise the temperature of the arsenic-containing material and the temperature of the oxygen-containing atmosphere in the roasting reactor to initiate the oxidation reaction. This can be accomplished by initially adding coal, propane, or butane, or another low combustion material to the roasting reactor.

The preferred roasting reactor is a circulating fluidized bed or an ebulating fluidized bed to facilitate the transfer of reactants and heat produced by the oxidation reaction and thereby increase both reaction rate and reaction uniformity. An additional advantage of a circulating fluidized bed is that it enables the precise control of the bed temperature.

The residence time of the arsenic-containing material in the roasting reactor preferably ranges from about 10 to about 120 minutes and more preferably from about 20 to about 40 minutes for the substantial completion of the oxidation and sulfation reactions.

The roasting offgas can be contacted with a scrubbing solution to remove the arsenic- and any sulfur-containing compounds, such as arsenic trioxide and sulfur dioxide, and other contaminants, such as entrained particulate matter. The scrubbing solution is preferably water and can be added as a portion of the pregnant leach solution discussed below. The scrubbing solution can be combined with the pregnant leach solution to enable the arsenic in the scrubbing solution, which is typically in the trivalent state, to be converted into ferric arsenate.

The roasted arsenic-containing material is next contacted with a lixiviant to form the pregnant leach solution containing dissolved arsenic oxides. The lixiviant preferably contains a leaching agent, which is dilute sulfuric acid and/or water, to facilitate the solubilization of the arsenic oxides. More preferably, the lixiviant is an aqueous solution which contains a sufficient amount of sulfuric acid to maintain the pH below about 0.5. Alternatively, the lixiviant can be hot water. To facilitate solubilization, the lixiviant can be contacted with the roasted arsenic-containing material in an agitated reaction vessel at elevated temperatures. The preferred temperature of the lixiviant ranges from about 20° C. to about 60° C. The contacting time preferably ranges from about 15 to about 60 minutes for substantially complete solubilization.

In a preferred embodiment, the pregnant leach solution includes a significant amount of the arsenic oxides in the roasted arsenic-containing material. More preferably, at least about 90% of the arsenic in the roasted arsenic-containing material is dissolved in the pregnant leach solution. The pregnant leach solution desirably contains from about 1.0 mg/l to about 50 g/l arsenic.

If the roasted arsenic-containing material contains iron, which is preferably in the form of ferric sulfate and/or ferric arsenate, a significant amount of the iron is preferably solubilized in the pregnant leach solution. More preferably, at least about 20% of the iron in the roasted arsenic-containing material is dissolved in the pregnant leach solution.

After contacting the roasted arsenic-containing material with the lixiviant, the roasted arsenic-containing material (e.g., leach residue) preferably contains a significantly reduced amount of arsenic. More preferably, the leach residue contains less than about 10% of the total arsenic content of the roasted arsenic-containing material before the contacting step.

In another embodiment, a product slurry from the solubilization step is subjected to liquid/solid phase separation to separate the pregnant leach solution from the roasted arsenic-containing material (e.g., leach residue). The leach residue can contain a significant portion of metals, such as gold and silver, to be recovered from the arsenic-containing material. It is therefore preferred that the arsenic content of the leach residue be less than about 0.05% by weight. To remove the pregnant leach solution from the leach residue and thereby substantially minimize the arsenic content of the leach residue, the leach residue is washed after the liquid/solid phase separation. The phase separation can be achieved using conventional thickeners or filters. As desired, the leach residue can be disposed of or subjected to further treatment to recover metals contained therein. For example, to recover gold the leach residue can be neutralized with a base material, such as lime, and treated by cyanidation techniques. The wash solution is preferably combined with the pregnant leach solution before the solubilized arsenic is converted into ferric arsenate.

The pregnant leach solution is treated to convert the solubilized arsenic into a ferric arsenate precipitate. This step should be conducted for a sufficient period of time to precipitate ferric arsenate and reduce the dissolved arsenic concentration in the pregnant leach solution to desired levels. For best results, this step is conducted in an agitated tank.

To enable the treated solution to pass the applicable environmental regulations, the concentration of the iron in the pregnant leach solution must be sufficient to convert a sufficient amount of the solubilized arsenic into the ferric arsenate precipitate to reduce the dissolved arsenic concentration to the required levels. The stoichiometric ratio of iron to arsenic in ferric arsenate is 1:1. It is therefore preferred that the ratio of iron to arsenic in the pregnant leach solution be at least about 2.5:1. The preferred concentration of ferric sulfate in the pregnant leach solution is at least three times that of the arsenic in the pregnant leach solution. To provide such iron levels in the pregnant leach solution, it may be necessary to add ferric sulfate or another soluble form of ferric iron, such as a ferric salt, to the pregnant leach solution.

In a preferred embodiment, the pregnant leach solution is contacted with an oxidant to convert trivalent arsenic in the pregnant leach solution, if any, to pentavalent arsenic, any ferrous iron into ferric iron, to prevent the reduction of any pentavalent arsenic and ferric iron which was oxidized during roasting, and to form ferric arsenate. The trivalent arsenic can be either incompletely oxidized arsenic from the roasting step or arsenic removed from the offgas by the scrubbing solution. The preferred oxidant is hydrogen peroxide, oxygen, and mixtures thereof. For hydrogen peroxide as the oxidant, the oxidation of trivalent arsenic into pentavalent arsenic proceeds according to the following equation:

$$2H_2O_2 + As_2O_3 \rightarrow As_2O_5 + 2H_2O$$

The pregnant leach solution preferably has a concentration of oxidant ranging from about 0.5 to about 5.0% by volume. The preferred temperature of the pregnant leach solution during oxidation ranges from about 20° C. to about 90° C. The preferred pH of the pregnant leach solution during oxidation ranges from about pH 2.5 to about pH 3.5.

A metal oxide, hydroxide, or carbonate is contacted with the pregnant leach solution to precipitate ferric arsenate. The ferric arsenate precipitate can be removed from the precipitate-containing pregnant leach solution to form the treated solution.

The preferred metal oxide or hydroxide is lime, hydrated lime, and mixtures thereof, with the most preferred base being hydrated lime. The preferred metal carbonate is calcium carbonate, sodium carbonate, and mixtures thereof, with calcium carbonate being most preferred. Hydrated lime can be easily added to the pH adjustment circuit as a slurry (milk of lime). Lime (CaO) or calcium carbonate ($CaCO_3$) will both react to form hydrated lime ($Ca(OH)_2$) in an aqueous medium within the pH range of interest. A commercial operation would be likely to purchase lime, slake it at their site, and then add the milk of lime slurry to the pH adjustment step. Calcium carbonate is less expensive than lime but may react too slowly for this application. Calcium compounds are preferred over sodium compounds for the pH adjustment step because their use will provide an outlet for calcium and sulfate through the precipitation of gypsum ($CaSO_4 \cdot 2H_2O$). If a sodium compound were employed, it would be necessary to bleed from the system to prevent the accumulation of sodium sulfate.

A sufficient amount of metal hydroxide is added to the oxidized pregnant leach solution to provide a pH ranging from about pH 1.5 to about pH 2.5. The temperature during the precipitation step preferably ranges from about 20° C. to about 90° C. Under such conditions, a variety of other compounds, such as hydrated calcium sulfate ($CaSO_4 \cdot 2H_2O$) and hydrated iron oxide (e.g., $Fe(OH)_3$ and $FeO(OH)$), will coprecipitate with the ferric arsenate.

While not wishing to be bound by any theory, it is believed that the net chemical reaction in the preferred embodiment for the oxidation and precipitation steps is as follows:

$$Fe_2(SO_4)_3 + As_2O_3 + 3Ca(OH)_2 + 2H_2O_2 \rightarrow 2FeAsO_4 + 3CaSO_4 \cdot 2H_2O + 3H_2O$$

or $$Fe_2(SO_4)_3 + As_2O_5 + 3Ca(OH)_2 + H_2O_2 \rightarrow 2FeAsO_4 + 3CaSO_4 \cdot 2H_2O + H_2O$$

As will be appreciated, a variety of other materials can also be employed in lieu of the reactants in the preceding equations to yield ferric arsenate.

It is possible that a portion of the arsenate ion may be removed by adsorption or coprecipitation with amorphous ferric hydroxide. As the pH increases above about pH 2 (i.e., becomes more basic) and the arsenic concentration of the solution decreases due ferric arsenate precipitation, ferric hydroxide becomes a stable phase that is precipitated. This is especially true at the pH range from about pH 4 to about pH 5. Typically, the majority of the arsenic will precipitate as ferric arsenate.

In the preferred embodiment, the ferric arsenate precipitate is removed from the precipitate-containing pregnant leach solution by filtration or gravity separation techniques to form stabilized solids containing the arsenic. As noted above, the stabilized solids are environmentally acceptable and can therefore be readily disposed of. Using the present invention, the treated solution can have an arsenic content of less than about 1 milligram per liter as determined by the EPA Toxicity Characteristic Leaching Procedure, which is sufficient to comply with environmental regulations.

The treated solution can be subjected to subsequent treatment steps to recover dissolved metals. By way of example, copper, nickel, cobalt or zinc will occur as water soluble sulfates in the treated solution. After ferric arsenate precipitation and removal, the sulfates can be recovered by suitable techniques from the treated solution, such as solvent extraction and electrowinning.

Figure 1A:
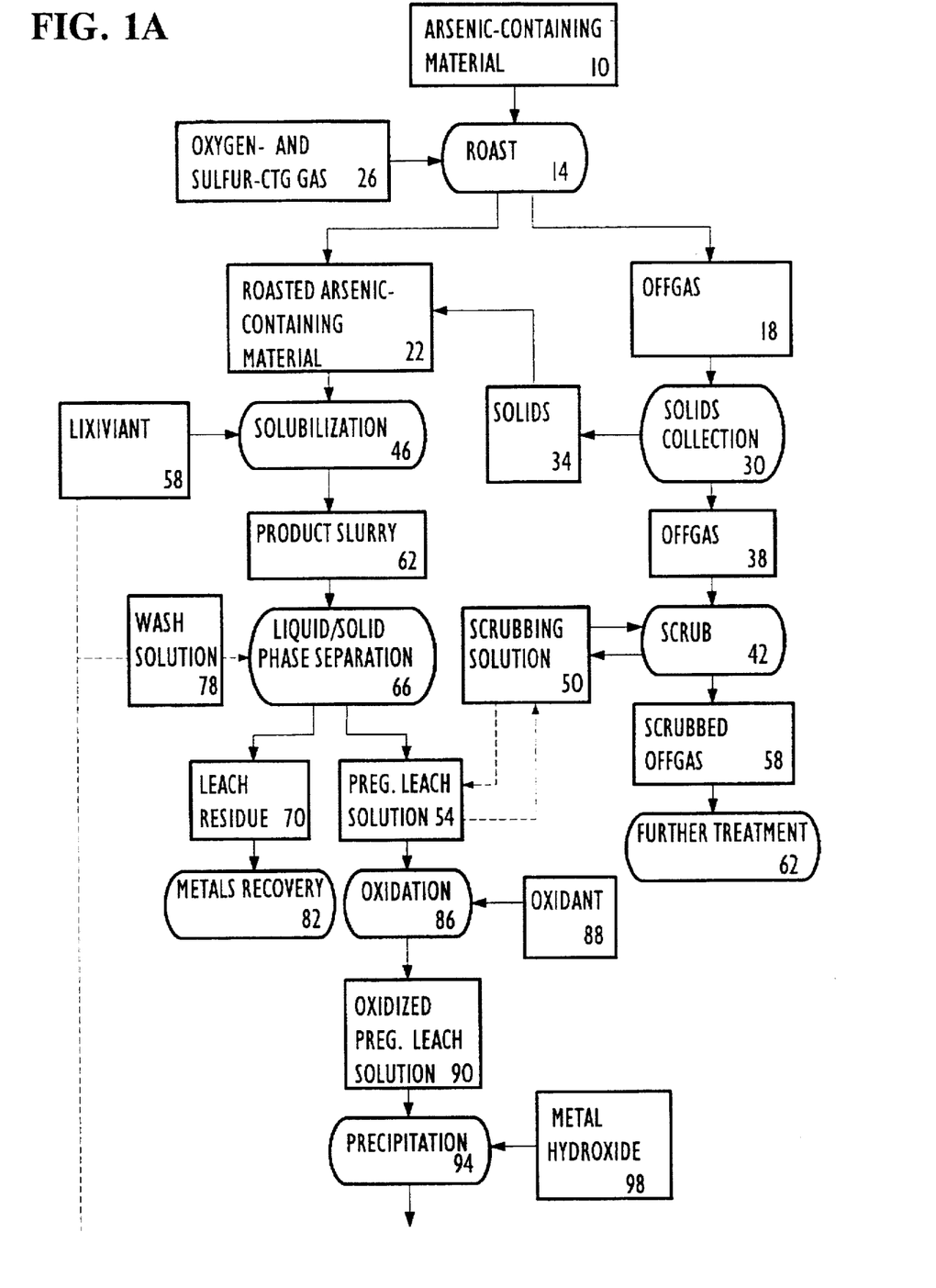
FIGS. 1A–B show a flow schematic of a preferred embodiment of the subject invention, illustrating the conversion of arsenic sulfides into ferric arsenate.
Figure 1B:
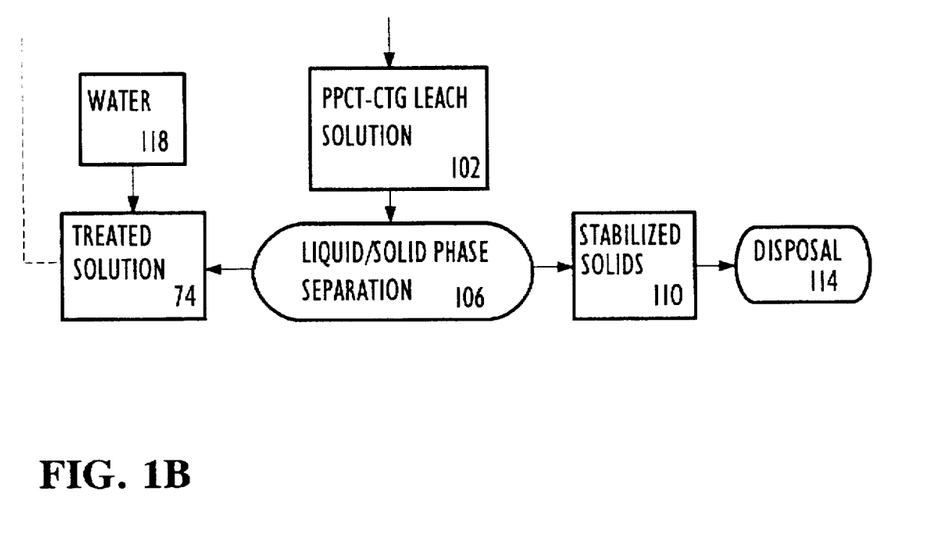

FIG. 1 depicts a preferred embodiment of the present invention applied to the arsenic-containing material. The preferred embodiment is particularly suited to an arsenic-containing material that is an ore or concentrate and contains copper and precious metals.

An arsenic-containing material 10 is roasted 14 to form an offgas 18 and a roasted arsenic-containing material 22. An oxygen-containing gas 26 is contacted with the arsenic-containing material during roasting to facilitate oxidation of the arsenic and sulfur and sulfation of the iron in the arsenic-containing material. The oxygen reacts with sulfides in the arsenic-containing material to form sulfur dioxide. If the arsenic-containing material is too low in sulfur, a pyrite concentrate may be blended with it prior to roasting.

The offgas 18 is subjected to solids collection 30 to form solids 34 and an offgas 38 for scrubbing 42. The solids 34 are combined with the roasted arsenic-containing material 22 before solubilization 46. The offgas 38 is subjected to scrubbing 42 with a scrubbing solution 50 to form a scrubbed offgas 58. The scrubbing solution 50 is a portion of a pregnant leach solution 54. The scrubbed offgas 58 is subjected to further treatment 62 to remove contaminants, such as sulfur dioxide, from the scrubbed offgas 58 prior to disposal.

The roasted arsenic-containing material 22 is subjected to solubilization 46 with a lixiviant 58 to form a product slurry 62. During solubilization 46, arsenic oxides, ferric sulfates, and ferric arsenates in the roasted arsenic-containing material 22 are dissolved in the liquid phase of the product slurry 62.

The product slurry 62 is subjected to liquid/solid phase separation 66 to form a leach residue 70 containing metals and the pregnant leach solution 54 containing the arsenic oxides, ferric sulfates, and ferric arsenates. A portion of a treated solution 74 is combined with water 118 to form a wash solution 78. The wash solution 78 is used during liquid/solid phase separation 66 to wash the leach residue 70 to remove arsenic and other contaminants from the leach residue 70. The leach residue 70 is subjected to metals recovery 82.

The pregnant leach solution 54 is contacted with a portion of the scrubbing solution 50, which also contains dissolved arsenic, and subjected to oxidation 86 with an oxidant 88 to form an oxidized pregnant leach solution 90. Through oxidation 86, the trivalent arsenic and iron in the pregnant leach solution 54 are converted into pentavalent arsenic and iron sulfate, respectively.

The oxidized pregnant leach solution 90 is subjected to precipitation 94 with a metal hydroxide 98 to provide a precipitate-containing pregnant leach solution 102. The precipitate includes ferric arsenate.

The precipitate-containing pregnant leach solution 102 is subjected to liquid/solid phase separation 106 to form stabilized solids 110 and the treated solution 74. The stabilized solids 110 contain the precipitated ferric arsenate for disposal 114. The treated solution 74 can be contacted with water 118 and re-used as the lixiviant 58 or the wash solution 78.

EXAMPLE 1

A series of leaching and precipitation experiments were conducted using roasted samples to analyze the ability to convert arsenic in the samples into ferric arsenate without compromising copper recovery from the filtrate and/or leach residue.

Four basic test protocols were followed. In Protocol No. 1, 50 g of calcine were added to 150 ml of water at 60° C. The resulting pulp was agitated for 5 minutes and then filtered. The leach residue solids were thoroughly washed with deionized water, dried, and submitted for chemical analysis. The leach liquor and the wash water were combined to form the filtrate and diluted to a known volume in preparation for chemical analysis. Protocol No. 2 was the same as Protocol No. 1, except that the leach was terminated after 2 hours instead of after 5 minutes. Protocol No. 3 was similar to Protocol No. 2, except that after 2 hours of leaching, the pH was adjusted to 2.5 by adding a calcium hydroxide ($Ca(OH)_2$) slurry. The resulting pulp was then held at temperature and agitated for another hour before filtration. Protocol No. 3 was designed to determine whether the arsenic concentration of the leach liquor could be effectively reduced without adversely affecting the extraction of copper from the solution. Protocol No. 4 was similar to Protocol No. 2 with the following exceptions. The starting pregnant leach solution contained 30 g/L sulfuric acid at 60° C. The hot slurry from contacting the calcine with pregnant leach solution was filtered and the leach residue solids were thoroughly washed with deionized water with the leach liquor (filtrate) being kept separate from the wash water. The filtrate was then added to a clean beaker and its temperature elevated to 60° C. with the pH being adjusted to 1.5 with sulfuric acid during aerating and agitating of the solution. Fifteen grams of ferric sulfate and 15 ml of 30% hydrogen peroxide were added and the filtrate agitated for approximately 30 minutes. The pH was slowly adjusted by adding calcium hydroxide until a pH of 2.6 was achieved. The resulting pulp was then allowed to agitate for an additional 20 minutes before filtration. This protocol was added to establish whether the copper and arsenic extraction efficiency from the leach residue could be improved by leaching samples of the roasting bed overflow (BOF) and final bed overflow (FBOF) calcine in dilute sulfuric acid and whether arsenic stabilization efficiency could be improved by adjusting the pH of the filtrate and spiking filtrate with additional ferric sulfate and hydrogen peroxide.

The analytical results of the experiments are summarized in Table 1.

TABLE 1

| Protocol | Sample | Copper Extraction, % | Arsenic in Filtrate, mg/L |
|---|---|---|---|
| 1 | BOF | 50.0 | 1.05 |
| 1 | FBOF | 34.4 | 0.59 |
| 2 | BOF | 46.1 | 70 |
| 2 | FBOF | 39.6 | 50 |
| 3 | BOF | 67.3 | 0.09 |
| 3 | FBOF | 39.0 | 1.67 |
| 4 | BOF | 69.0 | 0.01 |
| 4 | FBOF | 55.3 | 0.35 |

Based on the experiments, it appeared that the sulfation roast/leach approach was effective in stabilizing arsenic. The sulfuric acid leach solubilized significantly more arsenic than the hot water leach. The arsenic was readily precipitated from the filtrate to enable the filtrate to comply with the EPA Toxicity Characteristic Leaching Procedure while maintaining the copper in a recoverable form in the filtrate.

EXAMPLE 2

An experiment was conducted using an aqueous makeup solution of ferric sulfate and arsenic trioxide to analyze the ability to remove arsenic in the trivalent state from a solution. The aqueous solution of ferric sulfate was prepared (189.14 g in 500 ml $H_2O$) and heated to 59° C. Arsenic trioxide (35.14 g) was added and allowed to dissolve. After 1 hour, the temperature was 81° C., but the $As_2O_3$ did not appear to be totally dissolved; a small amount of yellow suspended particles was evident. After another hour and 12 minutes, the pH was below zero and the $As_2O_3$ had completely dissolved. One hundred five ml of 30% hydrogen peroxide were slowly added to the solution. After this addition, the solution appeared lighter in color and had a slight green tint. A 25 ml sample of the solution was taken ("$S_i$"). A total of 70.5 g of calcium hydroxide was added and the pH rose from less than zero to 2.6. The mixture was filtered and the filter cake washed. The washed filter cake ("P") was dried and submitted for analysis. The precipitate in the filter cake was tan with red chunks and had a dried weight of 284.33 g. The mixture was filtered and analyzed for arsenic. The final filtrate ("$S_f$") was clear and had a volume of 560.1 ml.

The experimental results are shown in Table 2.

TABLE 2

| Stream | Mass or Volume | Analysis, As | Distribution As, g | As, % |
|---|---|---|---|---|
| Feed: $As_2O_3$ | | | | |
| Total Products | 35.14 g | | 26.62 | 100 |
| P | 284.33 g | 8.73% | 24.82 | 93.2 |
| Si | 0.0251 | 50.0 g/l | 1.25 | 4.7 |
| SF | 0.5601 | 0.002 g/l | 0.001 | |
| Total | | | 26.07 | 97.9 |

As is evident from Table 2, the precipitate contained substantially all of the arsenic.

A modified EPA Toxicity Characteristic Leaching Procedure was conducted on the precipitate. The precipitate (60.1 g) was slurried with 500 ml $H_2O$ and then filtered. Five grams of the filtered solid were mixed with 100 ml of TCLP Solution No. 1 for 18 hours. The solution was filtered and a laboratory analysis of the filtrate indicated 0.305 mg/l arsenic. The regulatory limit for arsenic is 5 mg/l. The water filtered from the slurry was also analyzed and contained 0.205 mg/l arsenic.

EXAMPLE 3

An experiment can be conducted to develop process parameters for converting the pyrite in ores to ferric sulfate. The experiment was completed in a 4-inch fluidized bed reactor.

Chemical analysis revealed that a subsample of the concentrate contained 2.9% arsenic, 36.5% copper, 17.9% iron, 34.4% sulfur and 3.1% silica. Accordingly, the estimated mineralogical composition of the subsample would include 15.4% arsenopyrite, 36.4% chalcocite and 38.5% pyrite.

The desired operating windows for the roasting tests were based on phase stability diagrams for the Cu—S—O, Fe—S—O and As—S—O systems at 650° C. Based upon this information and upon previous operating experience, a reasonable target offgas composition is approximately 4% oxygen and 8% sulfur dioxide (remainder nitrogen). During the actual test, adjustments to the fluidizing gas composition were made as needed to maintain the desired bed temperature and target offgas composition levels. The bed overflow (BOF) calcine and cyclone underflow streams were periodically sampled during the test and selected samples were submitted for analysis. The resultant analytical data are summarized in Table 4.

TABLE 4

| Sample | As, % | Cu, % | Fe, % | $S_{total}$ | $SO_4^{2-}$ |
|---|---|---|---|---|---|
| 1100 BOF | 3.2 | 35.2 | 13.8 | 10.0 | 29.6 |
| 1100 CYC | 1.0 | 25.7 | 27.7 | 6.8 | 16.7 |
| Final BOF | 3.3 | 36.7 | 14.7 | 8.7 | 25.3 |
| Final CYC | 1.1 | 24.4 | 28.4 | 6.9 | 17.3 |

A mass balance was calculated based upon the respective copper and iron analyses of the 1100 bed overflow (BOF) and cyclone discharge (CYC) samples. The calculated balance indicated that approximately 0.888 kilograms (kg) of bed overflow and 0.204 kg of cyclone discharge were recovered for each kg of concentrate charged to the reactor.

The calculated balance indicates 104.8% arsenic retention in the bed solids. Realistically, some volatilization of $As_4O_6$ (g) would undoubtedly take place in a commercial operation, but this could be easily handled with a well designed offgas treatment system. Approximately 56% of the copper in the calcine and 43% of the copper in the cyclone discharge are present as sulfate. The remainder is suspected to exist as the oxide CuO and, in the cyclone underflow, as unreacted sulfide. The iron appears to have been predominantly converted to $Fe_2O_3$, but there was some evidence that a minor amount of ferric sulfate may also have formed.

EXAMPLE 5

Another experiment was conducted to determine the effectiveness of precipitating ferric arsenate from a chlorine-containing solution using a sodium hydroxide base. A solution containing 64.64 g of ferric chloride was dissolved in 500 ml of deionized water. The solution was heated to 60° C. and 10 g of $As_2O_3$ was added. Temperature and heating were maintained for 1 hour. The solution was allowed to cool overnight and was then filtered. The dried residue had a weight of 2.02 g and laboratory analysis showed that it contained 45.9% arsenic. Assuming that all other arsenic remained in solution, it was then calculated that 80% of the arsenic trioxide had dissolved in the ferric chloride solution. The initial pH of the filtrate was 0.89. After adding 50 ml of sodium hydroxide solution (5.33 g/100 ml $H_2O$), the pH rose to 1.28 and 3.94 g (dried) of precipitate formed. The filtrate was reacted with 15 ml of 30% hydrogen peroxide and the pH dropped from 1.15 to 0.26. Sixty milliliters of sodium hydroxide solution (40.58 g/100 ml $H_2O$) was added, and the pH went from 0.25 to greater than 3.5. A thick precipitate weighing 41.1 g (dry) was filtered from the filtrate. The filtrate was clear and contained 0.89 mg/L of arsenic.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A method for stabilizing arsenic from an arsenic-containing material, the arsenic being in the trivalent state in the form of a sulfide, comprising:

(a) roasting an arsenic sulfide-containing material in the presence of oxygen to form a roasted arsenic-containing material wherein (i) the partial pressure of the oxygen is controlled during the roasting step to convert a substantial portion of said arsenic sulfide into arsenic oxide and sulfur dioxide, with the arsenic in the arsenic oxide being in the pentavalent state, while retaining at least about 95% of said arsenic oxide in said roasted arsenic-containing material and (ii) in the instance where the arsenic-sulfide containing material contains iron, the partial pressure of sulfur dioxide is controlled to convert a substantial portion of said iron into an iron-containing salt;

(b) contacting said roasted arsenic-containing material with a lixiviant to solubilize said arsenic in said oxide and said iron salt, if any, from said roasted arsenic-containing material to form a pregnant leach solution; and (c) forming ferric arsenate in said pregnant leach solution containing dissolved arsenic.

2. The method as claimed in claim 1, wherein said arsenic-containing material contains a metal selected from the group consisting of: gold, copper, nickel, silver, cobalt, zinc, and mixtures thereof.

3. The method as claimed in claim 1, wherein said roasting step is conducted at a temperature ranging from about 500° C. to about 650° C.

4. The method as claimed in claim 1, wherein said partial pressure of oxygen ranges from about 0.1 to about 0.01 atm.

5. The method as claimed in claim 1, wherein said arsenic-containing material comprises iron and said partial pressure of sulfur dioxide ranges from about 0.1 to about 0.01 atm.

6. The method as claimed in claim 5, wherein said iron is in the form of a sulfide and at least about 20% of said iron is converted into said iron-containing salt.

7. The method as claimed in claim 1, wherein at least about 90% of said arsenic sulfide in said arsenic-containing material is converted into arsenic oxide in said roasting step.

8. The method as claimed in claim 7, wherein at least about 90% of said arsenic in said arsenic oxide is in the pentavalent state.

9. The method as claimed in claim 1, wherein said arsenic-containing material contains sulfur and at least about 50% of said sulfur is in said roasted arsenic-containing material after said roasting step.

10. The method as claimed in claim 1, wherein said roasting step produces an offgas and said offgas includes at most about 10% of the arsenic in the arsenic-containing material.

11. The method as claimed in claim 1, wherein said arsenic-containing material includes sulfur, said roasting step produces an offgas, and said offgas includes at most about 35% of the sulfur in the arsenic-containing material.

12. The method as claimed in claim 1, wherein said arsenic-containing material comprises trivalent arsenic and in said roasting step at least about 90% of said trivalent arsenic is converted into pentavalent arsenic.

13. The method as claimed in claim 1, wherein said lixiviant comprises a leaching agent that is selected from the group consisting of sulfuric acid, water, and mixtures thereof.

14. The method as claimed in claim 1, wherein said contacting step forms a leach residue and further comprising:

(d) separating said leach residue from said pregnant leach solution.

15. The method as claimed in claim 14, wherein said contacting step forms a leach residue and further comprising:

treating said leach residue to recover a metal in said leach residue.

16. The method as claimed in claim 14, further comprising:

(e) washing said leach residue with a wash solution after said separating step; and (f) contacting a portion of said wash solution with said pregnant leach solution in said forming step.

17. The method as claimed in claim 1, further comprising:

(g) scrubbing an offgas from said roasting step with a scrubbing solution; and (h) contacting a portion of said scrubbing solution with said pregnant leach solution in said forming step.

18. The method as claimed in claim 1, wherein said contacting step comprises:

contacting said pregnant leach solution with an oxidant selected from the group consisting of hydrogen peroxide, oxygen, and mixtures thereof.

19. The method as claimed in claim 1, wherein at least about 90% by weight of said arsenic in said roasted arsenic-containing material is dissolved in said pregnant leach solution.

20. The method as claimed in claim 1, further comprising:

(i) contacting said pregnant leach solution with a metal hydroxide at a pH ranging from about pH 1.5 to about pH 2.5 to precipitate said ferric arsenate.

21. The method as claimed in claim 1, wherein in said contacting step, metals from said roasted arsenic-containing material are dissolved in said pregnant leach solution and further comprising:

(j) removing said ferric arsenate from said pregnant leach solution; and (k) recovering said metals from said pregnant leach solution.

22. A method for stabilizing arsenic from a material containing trivalent arsenic and iron in the form of a sulfide, comprising:

(a) converting at least about 90% of said trivalent arsenic into pentavalent arsenic in the form of an oxide and said iron into a salt, wherein at least about 95% of said arsenic in said oxide and iron salt are contained in said material;

(b) contacting said material with a lixiviant at a temperature and pressure sufficient to solubilize said oxide and iron salt in a pregnant leach solution;

(c) converting any trivalent arsenic in said oxide into pentavalent arsenic by contacting said pregnant leach solution with an oxidant; and (d) forming at a temperature of at least about 90° C. a precipitate from said pregnant leach solution containing said pentavalent arsenic.

23. The method as claimed in claim 22, wherein said converting step (a) comprises:

roasting said material at a temperature less than about 650° C. in the presence of oxygen and sulfur dioxide.

24. The method as claimed in claim 22, wherein said contacting step (b) is conducted at a temperature ranging from about 20° C. to about 60° C.

25. The method as claimed in claim 22, wherein said converting step (c) is conducted at a temperature ranging from about 20° C. to about 90° C.

26. The method as claimed in claim 22, wherein in said converting step (c) the pH of said pregnant leach solution ranges from about pH 2.5 to about pH 3.5.

27. The method as claimed in claim 22, wherein said converting step (c) comprises:

contacting said pregnant leach solution with hydrogen peroxide; and wherein;

said pregnant leach solution has a concentration of hydrogen peroxide ranging from about 0.5 to about 5.0% by volume.

28. The method as claimed in claim 22, wherein said forming step comprises:

contacting said pregnant leach solution with a metal hydroxide at a pH ranging from about pH 1.5 to about pH 2.5.

29. The method as claimed in claim 22, further comprising:

(e) removing said precipitate from said pregnant leach solution to yield a treated solution having at least about 1 mg/L arsenic.

30. A method for stabilizing arsenic from an arsenic- and iron-containing material, comprising:

(a) roasting said arsenic-containing material in the presence of oxygen and sulfur dioxide at a temperature ranging from about 500° C. to about 650° C. to form a roasted arsenic- and iron-containing material containing arsenic pentoxide and ferric sulfate, wherein said oxygen has a partial pressure ranging from about 0.01 to about 0.1 atm and said sulfur dioxide has a partial pressure ranging from about 0.01 to about 0.1 atm, and wherein at least about 95% of said arsenic, after said roasting step, is contained in said roasted arsenic- and iron-containing material;

(b) dissolving at least a portion of said arsenic pentoxide and ferric sulfate in a lixiviant to form a pregnant leach solution;

(c) forming ferric arsenate in said pregnant leach solution containing dissolved arsenic pentoxide and ferric sulfate; and (d) precipitating said ferric arsenate from said pregnant leach solution at a temperature ranging from about 20° C. to about 90° C. and a pH ranging from about pH 1.5 to about pH 2.5.

* * * * *